(12) United States Patent
Jensen

(10) Patent No.: US 8,938,343 B2
(45) Date of Patent: Jan. 20, 2015

(54) AUTOMATIC SEQUENTIAL ACCESSORY MACHINE RETARDING ON A GRADE

(75) Inventor: Jeffrey Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 13/167,035

(22) Filed: Jun. 23, 2011

(65) Prior Publication Data
US 2012/0330523 A1 Dec. 27, 2012

(51) Int. Cl.
*B60T 8/1755* (2006.01)
*B60W 10/06* (2006.01)
*B60W 10/30* (2006.01)
*B60W 30/18* (2012.01)

(52) U.S. Cl.
CPC ............ *B60W 10/06* (2013.01); *B60W 10/30* (2013.01); *B60W 30/18136* (2013.01); *B60W 2300/17* (2013.01); *B60W 2510/0604* (2013.01); *B60W 2550/142* (2013.01); *B60W 2720/10* (2013.01); *B60W 2201/04* (2013.01)
USPC ........ 701/70; 701/1; 701/22; 701/48; 701/50; 701/53; 477/108; 477/115; 477/118; 477/186; 180/165; 180/179

(58) Field of Classification Search
CPC ............ B60W 10/06; B60W 2530/16; B60W 30/18136; B60W 2510/081; B60W 2510/305; B60W 10/30; B60W 2510/0604; B60W 2550/142; B60W 2720/10
USPC ............... 180/165, 179, 65.25; 188/296, 314; 303/191, 192; 477/108, 115, 118, 186, 477/35, 7, 80; 701/115, 22, 48, 498, 50, 51, 701/53, 54, 55, 65, 70, 82, 94, 97, 60, 36
See application file for complete search history.

(56) References Cited

U.S. PATENT DOCUMENTS

| | | | |
|---|---|---|---|
| 4,480,728 A | 11/1984 | Bailey et al. | |
| 5,842,376 A | 12/1998 | Dresden, III et al. | |
| 5,921,883 A | 7/1999 | Bellinger | |
| 5,983,149 A * | 11/1999 | Tate et al. | 701/48 |
| 6,067,489 A * | 5/2000 | Letang et al. | 701/36 |
| 6,223,592 B1 | 5/2001 | Genise | |
| 6,249,733 B1 | 6/2001 | Smith | |
| 6,292,726 B1 | 9/2001 | Gustavsson | |
| 6,299,263 B1 | 10/2001 | Uematsu et al. | |
| 6,349,253 B1 * | 2/2002 | Bellinger | 701/53 |
| 6,986,727 B2 | 1/2006 | Kuras et al. | |
| 7,249,810 B2 | 7/2007 | Grupp et al. | |
| 7,509,197 B2 * | 3/2009 | Landes et al. | 701/50 |
| 7,517,300 B2 | 4/2009 | Landes | |
| 7,672,771 B2 | 3/2010 | Nakanishi et al. | |
| 7,987,034 B2 | 7/2011 | Taffin | |
| 8,033,955 B2 | 10/2011 | Farnsworth | |

(Continued)

*Primary Examiner* — Helal A Algahaim
*Assistant Examiner* — Jelani Smith
(74) *Attorney, Agent, or Firm* — Leydig, Voit & Mayer, Ltd.

(57) ABSTRACT

A method of dissipating power on a propelled machine includes setting a target ground speed for the machine, and, if the throttle position is less than a first predetermined minimum and if the machine is on a negative grade in the direction of travel no greater than a second predetermined minimum, and the calculated machine resistance power is less than the calculated grade power, the method include engaging at least a portion of the energy-dissipating electrically or electrohydraulically controlled accessories to retard the machine to maintain the machine within a set range of a target speed.

20 Claims, 2 Drawing Sheets

(56) References Cited

U.S. PATENT DOCUMENTS

Figure 1:
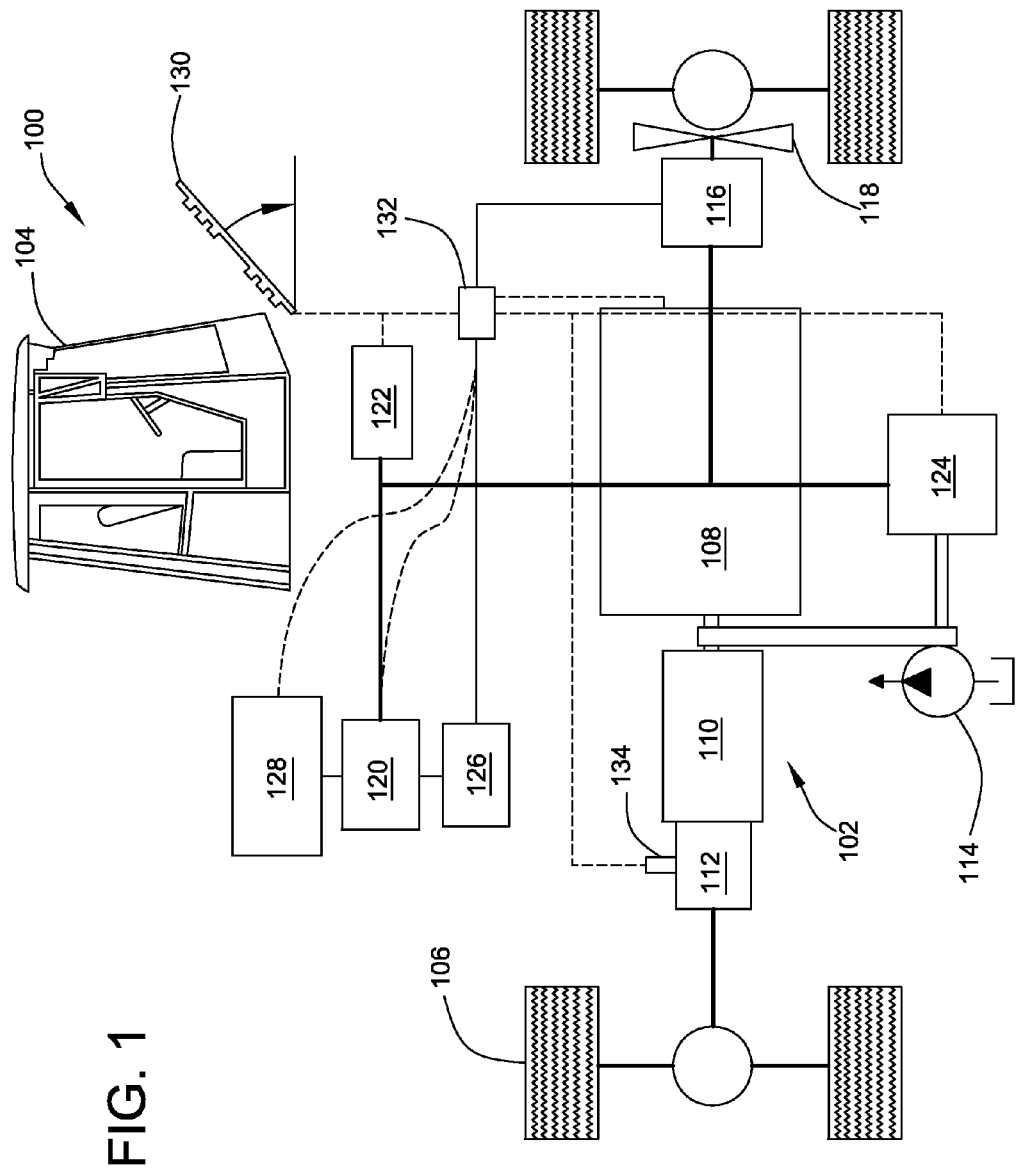

| | | |
|---|---|---|
| 8,214,113 B2 | 7/2012 | O'Neil et al. |
| 2004/0036592 A1* | 2/2004 | Vertenten .................. 340/453 |
| 2005/0006953 A1 | 1/2005 | Versteyhe et al. |
| 2005/0137060 A1* | 6/2005 | Kuras et al. ................ 477/214 |
| 2005/0255966 A1* | 11/2005 | Tao et al. .................... 477/27 |
| 2007/0099757 A1* | 5/2007 | Landes ........................ 477/175 |
| 2007/0099759 A1* | 5/2007 | Jamzadeh .................... 477/186 |
| 2007/0284170 A1* | 12/2007 | Kuras et al. ................. 180/165 |
| 2009/0025996 A1* | 1/2009 | Inoue et al. ................. 180/179 |
| 2009/0149296 A1 | 6/2009 | Eastman et al. |
| 2010/0137102 A1* | 6/2010 | Sopko et al. ................ 477/118 |
| 2012/0173060 A1 | 7/2012 | Sujan et al. |

\* cited by examiner

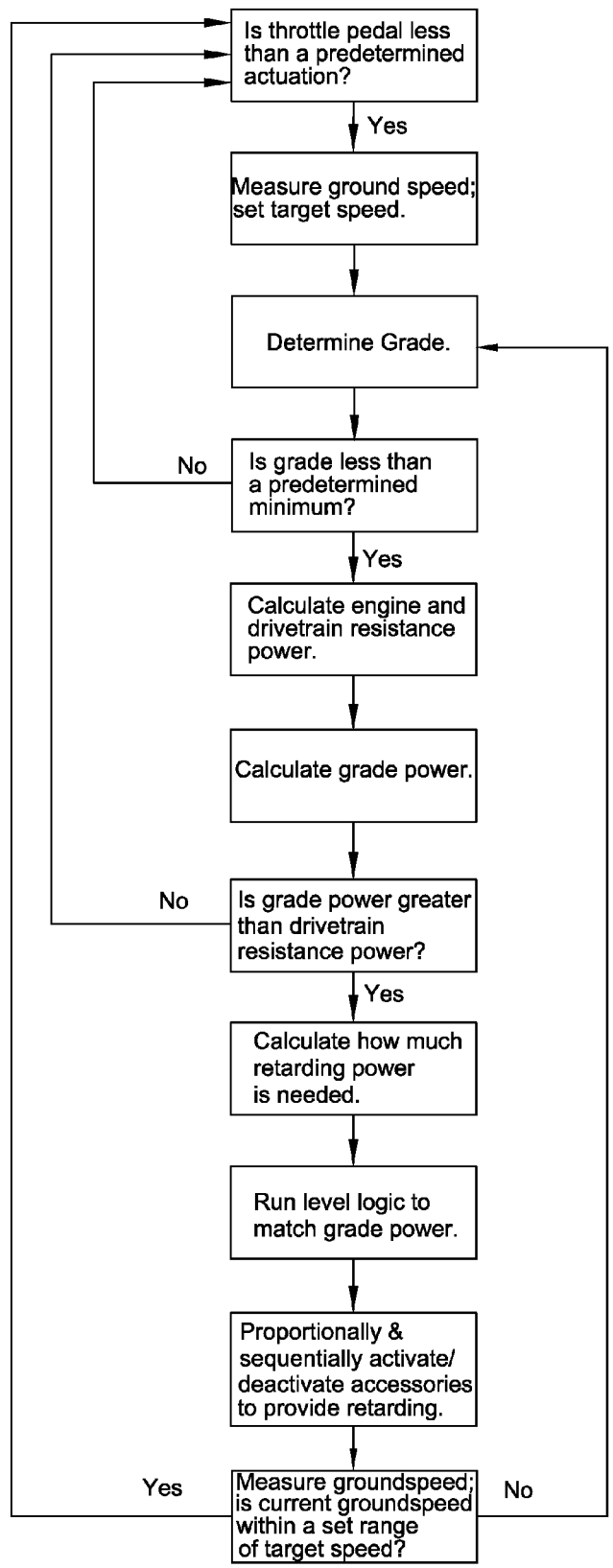

AUTOMATIC SEQUENTIAL ACCESSORY MACHINE RETARDING ON A GRADE

TECHNICAL FIELD

This patent disclosure relates generally to drive systems for propelled machines, and, more particularly to retarding control for propelled machines having a mechanical, hydrostatic, or electric drivetrain.

BACKGROUND

Friction braking systems may be inadequate to slow or stop machines in all circumstances. This can occur from travel down an incline, or exist just after the initiation of a directional shift of the machine from a reverse direction to a forward direction, or vice versa. Moreover, when utilized extensively for continuous periods, friction-based braking systems may be susceptible to "brake fade." Brake fade may be dangerous if the performance of the braking system is less than what is required to stop the machine, particularly when the machine is descending a hill or long incline. Extensive use of brakes also contributes to excessive brake pad wear, which may result in undesirable replacement costs and associated downtime.

Accordingly, many heavy machines include supplementary retarding systems. Conventional propelled machines having mechanical transmissions and drivetrains dissipate portions of undesired power as heat by way of mechanical clutches, torque converters, compression release braking, an exhaust brake, or a hydraulic retarder. The need for power dissipation is enhanced when traveling down inclines inasmuch as the machine may undesirably accelerate.

U.S. Publication 2007/0284170 to Kuras, et al. discloses a method for dissipating power in a propelled machine having a hydromechanical transmission. The method includes converting undesired power to retarding power, and driving the engine with at least a portion of the retarding power prior to dissipating power with any other power-dissipating device. If a measured speed of the machine is greater and not sufficiently close to the speed input from the operator, the level of retarding power required is calculated, and a strategy is executed that engages a hierarchy of devices to providing retarding power. More specifically, in a hydromechanical transmission, retarding power is directed to both the internal combustion engine, and a hydraulic relief valve, and/or a hydraulic powered accessory, and/or an energy storage component.

SUMMARY

The disclosure describes, in one aspect, a method of automatically dissipating power on a propelled machine. The method includes setting a target speed, determining if the throttle position is less than a first predetermined minimum, determining if the machine is on a grade no greater than a second predetermined minimum, the grade being less than zero, calculating an internal machine resistance power, determining if the machine resistance power is adequate to maintain the machine within a set range of the target speed, and, if the throttle position is less than the first predetermined minimum, the grade is less than the second predetermined minimum, and the machine resistance power is inadequate to maintain the machine within the set range of the target speed, engaging select accessories to retard the machine to maintain the machine within the set range of the target speed.

In another aspect, the disclosure describes a method of automatically dissipating power on a propelled machine that includes setting a target speed, determining if the throttle position is less than a first predetermined minimum, determining if the machine is on a grade no greater than a second predetermined minimum, the grade being less than zero, determining if ground speed is greater than target speed, determining if machine ground speed is accelerating, and, if the throttle position is less than the first predetermined minimum, the grade is less than the second predetermined minimum, and the ground speed is greater than the target speed and accelerating, engaging select accessories to retard the machine to maintain the machine within a set range of the target speed.

In a further aspect, the disclosure describes a method of automatically dissipating power on a propelled machine, including setting a target speed, determining if the throttle position is less than a first predetermined minimum, determining if on a grade is less than a second predetermined minimum, the grade being less than zero, calculating an internal machine resistance power, determining grade power required to maintain machine within a set range of the target speed, determining if the machine resistance power is adequate to maintain the machine within the set range of the target speed, if the throttle position is less than the first predetermined minimum, the grade is less than the second predetermined minimum, and the machine resistance power is inadequate to maintain the machine within the set range of the target speed, determining retarding power required to maintain the machine within the set range of the target speed, and engaging select accessories to provide the required retarding power to maintain the machine within the set range of the target speed.

BRIEF DESCRIPTION OF THE DRAWING(S)

FIG. 1 illustrates a schematic representation of various systems of a propelled machine in accordance with an exemplary embodiment of the present disclosure; and FIG. 2 is a flow diagram illustrating an exemplary retarding strategy of the present disclosure.

DETAILED DESCRIPTION

This disclosure relates to a strategy for controlling the ground speed of a propelled machine (indicated generally as 100), which is illustrated schematically in FIG. 1. The term "machine" may refer to any machine that performs some type of operation associated with an industry such as mining, construction, farming, transportation, or any other industry known in the art that is propelled by a traditional mechanical, hydrostatic or electric drivetrain 102, and that includes accessories that are controlled electrically or electrohydraulically, as will be explained in greater detail below. By way of example only, such a machine 100 may be a wheel loader, hauling truck, track-type tractor, or motor grader. Moreover, one or more implements (not illustrated) may be connected to the machine 100. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, shears, snow plows, snow wings, and others.

The machine 100, illustrated schematically in FIG. 1, includes a body having a cab 104, and is propelled on wheels or sprockets 106. The drivetrain 102 includes an internal combustion engine 108 coupled to provide power to a transmission 110. During propulsion of the propelled machine 100 by the drivetrain 102, the internal combustion engine 108 combusts fuel to drive the transmission 110. The transmission 110, in turn, provides power to drive the wheels or sprockets 106.

The transmission 110 may be of any appropriate design. For example, a hydromechanical transmission 110 may by provided. By way of further example, the transmission 110 may be a planetary type transmission (not shown), power being conveyed by the transmission 110 to an output transfer gear 112. Brakes (not illustrated) may be coupled to each wheel or sprocket 106.

The internal combustion engine 108 may be of any conventional type and size. For example, the internal combustion engine 108 may be a diesel, gasoline, or natural gas driven engine. The engine 108 may be coupled to drive a number of electric or electrohydraulic accessories of the propelled machine 100. For example, the internal combustion engine 108 may be mechanically coupled to drive one or more of the following: one or more hydraulic pumps 114, a cooling fan motor 116 and fan 118, an alternator or generator 120, an AC compressor 122, one or more water pumps (not shown), an accumulator (not shown), or other energy storage device. The illustrated hydraulic pump 114 may further be coupled to a motor 124, and may be adapted for operations such as operation of controls for one or more implements, steering, brake application, or a hoist. The alternator/generator 120 may be coupled to a battery 126, and may be adapted to direct operational power to accessories such as, for example, lights, heated mirrors, and window defrosters 128.

In use, the operator (not shown) selectively actuates a throttle 130 which provides a signal (discussed below) to an electronic control module 132. It is understood that the retarding strategy 40 is driven by the electronic control module 132. The electronic control module 132 may be of any conventional design having hardware and software configured to perform the calculations and send and receive appropriate signals to perform the retarding logic. The electronic control module 132 may include one or more controller units, and may be configured solely to perform the retarding strategy, or to perform the retarding strategy and other processes of the propelled machine 100.

While a throttle pedal 130 is illustrated, it will be appreciated that the throttle 130 may be of an alternate type, such as, for example, a joystick, a lever, or another arrangement that may be selectively controlled by the operator. Based upon the operator input from the throttle 130 and, optionally, one or more other devices, the electronic control module 132 provides one or more signals to cause the operation of the drive train 102 to propel the machine 100. Additional devices may provide signals to the electronic control module 132, such as, for example, the alternator/generator 120, the battery 126, and one or more sensors.

Brakes (not shown) may be separately actuated by the operator to slow or stop the machine 100. The brakes (not shown) may be of any conventional type having variable control. For example, the brakes may be mechanically or hydraulically actuated by an appropriate mechanical or fluid control system, or may be in the form of a hydraulic retarder. During application of the brakes, power of the machine 100 is dissipated from the brakes in the form of released heat. Accordingly, the brakes may require an appropriate cooling system.

While the brakes may be utilized to dissipate undesired power, excessive braking during travel down an incline may result not only undesirable released heat, but also excessive noise and wear. Thus, although the brakes may be the primary braking system for the propelled machine 100 during most operations, according to the disclosure, a supplemental retarding method is provided for use when the machine 100 is traveling down an incline. More specifically, according to the disclosure, there is presented a method of dissipating undesired power/energy added to the propelled machine 100 as a result of travel down an incline. It is understood that the terms "energy" and "power" are referred to herein interchangeably, in that power is merely the time derivative of energy.

Turning to FIG. 2, there is illustrated an exemplary method of automatically retarding power developed in the machine 100 as a result of travel down an incline. In short, the method is automatically operative when the throttle 130 position is at less than a predetermined actuation, and the machine 100 is traveling down an incline or grade, and the retarding power of the powertrain 102 and frictional losses of the machine 100 are not adequate to dissipate undesired energy resulting from travel down the incline. While various determinations or calculations are undertaken according to the method, those of skill in the art will appreciate that a number of the steps may be undertaken in an order other than as illustrated, so long as the retarding is undertaken based upon the level of power to be dissipated. It will further be appreciated, however, that it may be desirable to perform some or all of the steps in the illustrated order.

According to the method, a signal is provided to the electronic control module 132 as to the level at which the throttle 130 is actuated, and a determination is made as to whether the throttle 130 position is less than a first predetermined minimum actuation. For example, the first predetermined minimum may be on the order of 5% or less, measured as a percentage of complete actuation, or full depression in the case of a throttle pedal. If the throttle 130 position is not less than the predetermined minimum, the remaining steps of the method are not undertaken until such time as the throttle 130 position is less than the first predetermined minimum actuation.

According to another step of the method, a target ground speed is set. In an embodiment, the target speed is set based upon the ground speed generally prior to acceleration due to travel down an incline. The target speed may be based upon data particular to the machine 100, such as machine weight and machine type, as well as other defining safety parameters. The target speed may additionally take into account the grade as will be defined below.

Ground speed may be determined by any appropriate method, such as, for example, by the use of ground radar, the use of one or more sensors, by calculation, or by a combination of any of the above. In an embodiment, a sensor 134 measures the speed of the transmission 110, or, more specifically, the speed of the output gear 112 of the transmission 110. The ground speed is then calculated based upon the sensed speed and various parameters of the machine 100. In an embodiment, this calculation includes dividing the sensed speed of the transmission by the axle ratio multiplied by the tire circumference. According to another embodiment, it may be determined if the machine 10 is accelerating by way of an appropriate sensor or the like that directly measures ground speed.

According to another step of the method, the grade is determined. More specifically, it is determined if the machine is on a downhill grade, and if the grade is less than a second predetermined minimum. It will be appreciated that grades less than the second predetermined minimum would include steeper negative grades than the second predetermined minimum. In an embodiment, the grade is quantified as a percentage, that is, the vertical drop over a horizontal distance traveled, thus providing a negative number when the machine 100 is traveling downhill.

Grade (G) may be determined by any appropriate method. For example, the grade may measured by a sensor. In an embodiment the second predetermined minimum may be on the order of 4%, although the second predetermined minimum may be greater or lesser, depending upon the particulars of the machine 100, such weight, location of the center of gravity, etc.

Grade power (GP) is then determined for the identified grade. Grade power (GP) is the power produced by a given gross weight machine descending a known grade at a constant ground speed. Grade power may be determined by any appropriate method, including the following equation when English units are utilized:

$$GP=GVW \cdot S \cdot G/37500 \qquad (1)$$

Where:
GP is the grade power in horsepower (hp);
GVW is the gross vehicle weight in pounds (lbs.);
G is the grade measured as a percentage (%); and
S is the ground speed in miles per hour (mph).

The Grade power may be determined by the following equation when International Standard units of measure are utilized:

$$GP=GVW*S*G/36708.5$$

Where:
GP is grade power in kilowatts (kW);
GVW is gross vehicle weight in kilograms (kg);
G is the grade measured as a percentage (%); and
S is the ground speed in kilometers per hour (km/hr).

The machine 100 may dissipate power as a result of machine retarding resulting from parasitic losses in the machine 100 itself and the application of brakes (not shown). Thus, the total machine retarding (TMR) is determined by braking power (BP) and machine resistive power (MRP).

$$TMR=BP+MRP$$

Machine resistive power (MRP) includes the parasitic losses of the machine as a result of machine operation and frictional losses. Machine resistance power is based upon the rolling resistance power (RRP) of the tires as a function of ground speed (gs), and the resistance of the powertrain or engine and drivetrain friction power (EDFP) as a function of engine and ground speeds (es, gs). In other words, machine resistance power is determined as follows:

$$MRP=RRP(gs)+EDFP(es,gs)$$

According to another step of the method, the grade power (GP) is compared to the machine retarding power (MRP). If the grade power (GP) is less than the machine retarding power (MRP), the method returns to an earlier step. In the illustrated embodiment, it returns to the first step, that is, a determination of whether the throttle position is less than a predetermined actuation.

Conversely, if grade power (GP) is greater than the total machine retarding (TMR), the machine 100 will increase in speed when traveling down a grade. In other words, in operation, as a machine 100 travels down a grade, the machine 100 will increase in speed if the total machine retarding (TMR) is inadequate to dissipate the power resulting from travel down the grade.

In order to minimize the level of braking power (BP) under such circumstances, however, it is desirable to increase the machine resistive power (MRP). By placing additional loads on the system, the machine resistive power (MRP), more specifically, the engine and drivetrain frictional power (EDFP) may be increased. According to the disclosed method, the machine resistive power (MRP) may be selectively and controllably increased by selectively engaging or disengaging various components of the machine 100 to create additional drag on the engine and drivetrain. According to the method, the level of additional retarding power required is determined as the difference between the grade power (GP) and the machine retarding power (MRP).

According to the next step, level logic is run to increase loads in the system to cause the machine retarding power (MRP) to match the grade power (GP). According to the level logic, accessories are turned on to increase retarding. The accessories may be turned on proportionally and sequentially. By way of example only, resulting actions may include turning on lights, heated mirrors, and/or window defrosters 128, charging of the battery 126, the actuation of the cooling fan motor 116 or the air conditioning compressor 122, and/or actuation of electrohydraulically controlled implements, steering, brakes, hoists, or displacement pumps 114. In this regard, checks may be undertaken in order to determine the current status of the respective accessories, and, accordingly, the appropriateness of actuating the same. For example, it may be determined if the cooling motor and fan 116, 118 are already engaged, if the coolant temperature is greater than a predetermined temperature, etc.

According to an embodiment of the level logic, various levels are provided. The various levels may provide varied ranges of retarding. In an embodiment, the various levels are examined from low retarding levels through high retarding levels. In another embodiment, the logic first addresses the highest level to provide desired retarding, and then completes the required retarding with lower levels. In yet another embodiment, priority is given to particular retarding accessories, such as, for example, large or small pumps. In alternate embodiments, priority may be given to particular retarding accessories base upon environmental factors, such as weather. The following is one example of such level logic are provided by way of example only, and may differ depending upon the type of machine and the particulars of the accessories. Moreover, as the method proceeds, accessories may be engaged and others disengaged in order to provide the desired level of retarding power.

According to one embodiment of the method, at level one of the retarding logic, the alternator/integrated starter generator is loaded in order to provide retarding in the range of 1-20 HP. At this level, status checks are performed and the electronic control module 132 receives signals indicating if the battery 126 is fully charged. If so, than one or more lights are turned on, heated seats and mirrors are turned on, and/or the defroster is turned on (identified generally as 128 in FIG. 1).

According to level two logic, components of the cooling system may be engaged to provide retarding power in the range of 10-50 HP. In this level, the cooling fan 116 is actuated and/or the air conditioning compressor 122 is actuated. Status checks may be undertaken to determine whether the cooling fan 116 or air conditioning compressor 122 should be actuated, including, for example, whether the intake air temperature is above an applicable predetermined temperature, the engine coolant temperature is above an applicable predetermined temperature, and the operator module air temperature is above a predetermined temperature.

According to level three logic, one or more small pumps may be engaged to provide retarding power in the range of 20-100 HP. Status check may be undertaken to determine whether and which small pumps should be engaged, including status checks of whether the hydraulic oil is above an appropriate predetermined temperature, and whether the steering and/or braking circuits are being used.

According to level four logic, one or more of the large pumps may be engaged to provide retarding power in the range of 50-750 HP. Status checks may include determinations of whether the hydraulic oil is above an appropriate predetermined temperature, and whether implement and/or hoist circuits are being used.

According to the logic, accessories are sequentially and proportionally activated to increase the retarding by a given amount for each activation. For the purposes of this disclosure, the terms accessory and accessories will include not only accessories that may be optionally activated by the operator from the cab, such as lights, heated mirrors, and window defrosters 128, but also components such as pumps 114, motors 116, 124, compressors 122, alternators/generators 120, and the like. It will be appreciated by those of skill in the art that this sequential and proportional actuation increases the machine retarding power (MRP), with the target of matching the grade power (GP) to minimize or eliminate the use of brakes to slow the machine 100 when traveling down a grade.

According to the next step, the ground speed is measured by any appropriate arrangement and compared to the target speed. If the ground speed is within a set range of the target speed, then the method begins again, that is, it is determined if the throttle position is less than a predetermined actuation. Conversely, if the ground speed is not within the set range of the target speed, then the level logic is run again. The set range may be any appropriate range that is within desired safety parameters. In an embodiment, the range may be within plus or minus three miles per hour. In the illustrated embodiment, if the ground speed is not within the set range of the target speed, the method returns to the step of determining the grade, and then proceeds through the step as outlined in FIG. 2 and above.

INDUSTRIAL APPLICABILITY

The present disclosure is applicable to any machine that performs some type of operation associated with an industry such as mining, construction, farming, transportation, or any other industry known in the art that propelled by a traditional mechanical, hydrostatic or electric drivetrain 102, and that includes accessories that are controlled electrically or electrohydraulically. By way of example only, such a machine 100 may be a wheel loader, hauling truck, track-type tractor, or motor grader.

One or more embodiments of the disclosure may enhance safety of such machines 100. One or more embodiments may minimize the opportunity for brakes overheating, or brake fade, as well as excessive noise and wear.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of automatically dissipating power on a propelled machine having a throttle and moving at a ground speed in a direction of travel, the machine having a plurality of energy-dissipating accessories that are at least one of electrically and electrohydraulically controlled, the method comprising:
setting a target ground speed for the machine,
determining if the throttle position is less than a set first predetermined minimum,
determining if the machine is on a negative grade in the direction of travel,
determining if the grade in the direction of travel is less than a second predetermined minimum,
calculating power level required to maintain the machine within a set range of the ground target speed based upon measured ground speed and determined grade,
calculating an internal machine resistance power,
determining if the machine resistance power is adequate to maintain the machine within a set range of the target speed, and
if the throttle position is less than the set first predetermined minimum, the grade is less than the second predetermined minimum, and the machine resistance power is inadequate to maintain the machine within a set range of the target speed, calculating a level of retarding power required to maintain the machine within the set range of the target speed,
performing a level logic to identify which of the plurality of energy dissipating accessories to selectively engage to increase machine retarding power to maintain the machine within the set :range of the target speed, and
proportionally and sequentially engaging the energy-dissipating accessory or accessories identified by performing the level logic to retard the machine.

2. The method of claim 1 wherein the step of setting the target ground speed includes setting the target ground speed at a ground speed prior to acceleration based upon a negative grade in the direction of travel.

3. The method of claim 1 wherein the set first predetermined minimum is less than five percent.

4. The method of claim 1 wherein the second predetermined minimum is on the order of negative four percent.

5. The method of claim 1 wherein the set range is less than +/−3 miles per hour.

6. The method of claim 1 further including determining ground speed.

7. The method of claim 6 further including comparing the ground speed to the set range of the target ground speed, engaging at least one additional available energy-dissipating accessory or alternate available energy-dissipating accessory based upon the comparison of the ground speed to the set target speed.

8. The method of claim 1 wherein the plurality of energy dissipating accessories includes at least one of the following: lights, heated mirror, defroster, air conditioning, pump, hoist, cooling fan, a pump, a hoist, a hydraulic cylinder, an electrically controlled accessory, and an electrohydraulically controlled accessory.

9. A method of automatically dissipating power on a propelled machine having a throttle and moving at a ground speed in a direction of travel, the machine having a plurality of energy-dissipating accessories that are at least one of electrically or electrohydraulically controlled, the method comprising:
  setting a target ground speed,
  determining if the throttle position is less than a set first predetermined minimum,
  determining if a grade in the direction of travel is less than a second predetermined of minimum, the grade being less than zero,
  determining if the ground speed is greater than the target ground speed,
  determining if the machine ground speed is accelerating, and
  calculating power level required to maintain machine within a set range of the target speed based upon the ground speed and the grade determined, and
  if the throttle position is less than the set first predetermined minimum, the grade is less than the second predetermined minimum, and the ground speed is greater than the target speed and accelerating, calculating a level of retarding power required to maintain the machine within the set range of the target speed,
  performing a level logic to identify which of the plurality of energy dissipating accessories to selectively engage to increase machine retarding power to maintain the machine within the set range of the target speed, and
  engaging the a Table energy-dissipating accessory or accessories identified by performing the level logic to retard the machine.

10. The method of claim 9 wherein the step of setting the target ground speed includes setting the target ground speed at a machine speed prior to acceleration based upon a negative grade in the direction of travel.

11. The method of claim 9 wherein the set first predetermined minimum is at most five percent, the second predetermined minimum is less than negative four percent, and the set range is at most +/−3 miles per hour.

12. The method of claim 9 wherein engaging the available energy-dissipating accessories includes a step of an electronic control module engaging at least a portion of the available energy-dissipating accessories based upon an internal logic.

13. The method of claim 12 wherein the engaging step further includes the electronic control module engaging energy-dissipating accessories based upon a preset hierarchy of accessories based upon their energy dissipation.

14. The method of claim 9 further including comparing second measured ground speed to the set range of the target ground speed, engaging at least one additional available energy-dissipating accessory or alternate available energy-dissipating accessory based upon the comparison of the second measured ground speed to the set target ground speed.

15. A method of automatically dissipating power on a propelled machine having a throttle and moving at a ground speed in a direction of travel, the machine having a plurality of energy-dissipating accessories that are at least one of electrically and electrohydraulically controlled, the method comprising:
  setting a target ground speed,
  determining if the throttle position is less than a set first predetermined minimum,
  determining if the machine is on a grade in the direction of travel and the grade is less than a second predetermined minimum, the grade being negative,
  calculating power level required to maintain the machine within a set range of the target ground speed based upon the ground speed and the determined grade,
  calculating an internal machine resistance power,
  determining grade power required to maintain the machine within the set range of the target ground speed,
  determining if the machine resistance power is adequate to maintain the machine within the set range of the target ground speed, and
  if the throttle position is less than the set first predetermined minimum, the grade is less than the second predetermined minimum, and the machine resistance power is inadequate to maintain the machine within a set range of the target speed, determining retarding power required to maintain the machine within the set range of the target ground speed, and
  performing a level logic to identify which available energy-dissipating accessories of the plurality of energy-dissipating accessories to selectively engage to provide the required retarding power to maintain the machine within the set range of the target ground speed, and
  engaging the energy-dissipating accessories identified by performing the level logic to retard the machine.

16. The method of claim 15 wherein the step of setting the target ground speed includes setting the target speed at machine ground speed prior to acceleration based upon the negative grade in the direction of travel.

17. The method of claim 15 wherein the set first predetermined minimum is less than five percent, the second predetermined minimum is less than negative four percent, and the set range is less than +/−3 miles per hour.

18. The method of claim 15 further including determining ground speed, and comparing the ground speed to the set range of the target ground speed, and the engaging step includes engaging select available energy-dissipating accessories to provide the required retarding power to maintain the machine within the set range of the target ground speed, determining a second ground speed, comparing the second ground speed to the set range of the target ground speed, and changing the particular available energy-dissipating accessories engaged to provide an alternate level of retarding.

19. The method of claim 15 wherein the energy-dissipating accessories include at least one of the following: lights, heated mirror, defroster, air conditioning, pump, hoist, cooling fan, an electrically controlled accessory, and an electrohydraulically controlled accessory.

20. The method of claim 15 further including a step of an electronic control module engaging at least a portion of the energy-dissipating accessories based upon a preset hierarchy of accessories based upon respective energy dissipation.

* * * * *